United States Patent [19]
Kam-Hoi

[11] Patent Number: 5,791,763
[45] Date of Patent: Aug. 11, 1998

[54] ELECTRONIC CONTROL BATTERY-OPERATED DEVICE OF LAMP WITH FAN

[75] Inventor: Chan Kam-Hoi, Shatin, Hong Kong

[73] Assignee: Go-Gro Industries Limited, Kowloon Bay, Hong Kong

[21] Appl. No.: 709,011

[22] Filed: Sep. 6, 1996

[30] Foreign Application Priority Data

Apr. 1, 1996 [CN] China ............... 96 1 03318.5

[51] Int. Cl.$^6$ ................................................. F21L 11/00
[52] U.S. Cl. .................... 362/183; 362/96; 362/198; 362/205; 362/253; 320/115
[58] Field of Search ...................... 416/5; 362/96, 362/157, 197–199, 205, 208, 234, 253, 457, 800, 183, 184, 190, 399, 285, 418, 419; 320/107, 113–115

[56] References Cited

U.S. PATENT DOCUMENTS

| | | | |
|---|---|---|---|
| 1,504,003 | 8/1924 | Trumbull | 362/208 |
| 1,639,753 | 8/1927 | Shelton | 362/253 |
| 2,909,316 | 10/1959 | Prohaczka et al. | 416/5 |
| 4,200,904 | 4/1980 | Doan | 362/183 |
| 4,535,391 | 8/1985 | Hsiao | 362/183 |
| 4,586,117 | 4/1986 | Collins | 362/199 |
| 4,974,126 | 11/1990 | Hwang | 362/96 |
| 5,165,048 | 11/1992 | Keller et al. | 362/183 |
| 5,603,562 | 2/1997 | Huang | 362/96 |

*Primary Examiner*—Alan Cariaso
*Attorney, Agent, or Firm*—Felfe & Lynch

[57] ABSTRACT

The present invention relates to a kind of device of lamp with fan, in particular, an electronic control multi-function lamp with fan for camping purposes, comprising a head lamp, a fan head, a flexible arm set, a handle and a base, said head lamp and said fan head being detachable so that when one of them is fitted said device can be used as a lamp or a fan, respectively; also comprising a three-way connector with which both the head lamp and the fan head can be used simultaneously. The device contains a multi-function electronic control circuit board, and a multi-position seletor switch capable of making said head lamp flash to be used as a signal lamp besides usual lighting; said handle containing a number of LED's, used as tail lights; and said fan being provided with a speed-change switch, capable of increasing the fan's speed under multiplied voltage.

16 Claims, 12 Drawing Sheets

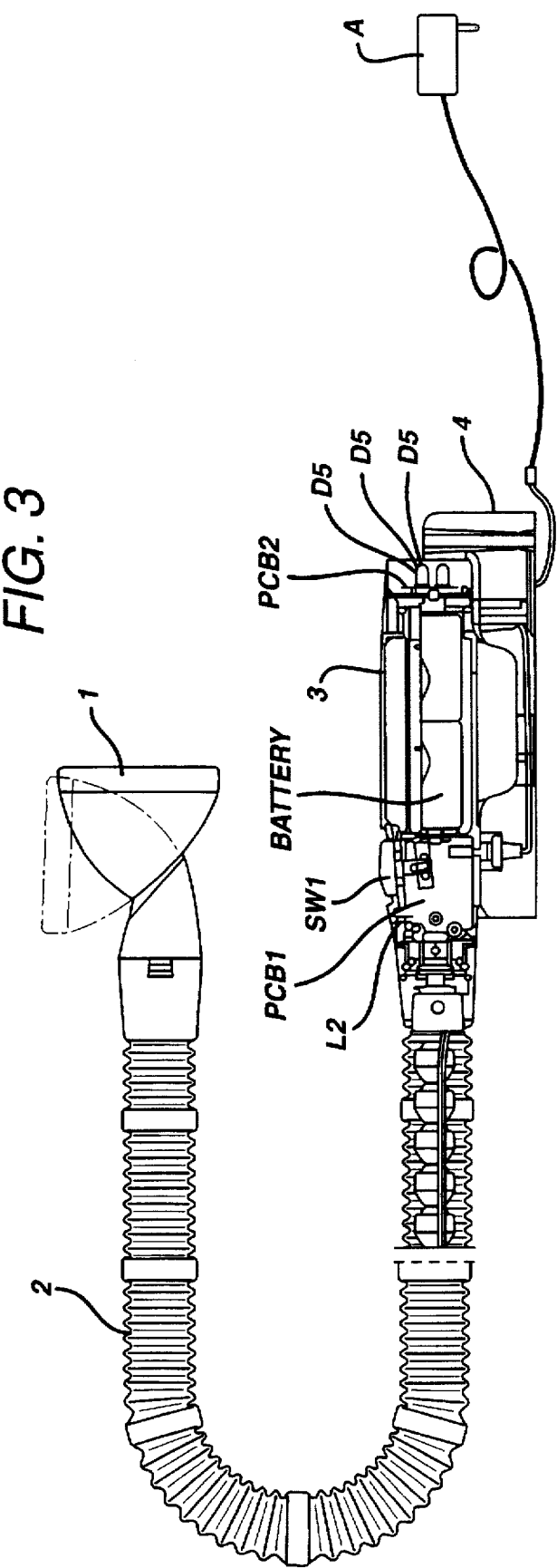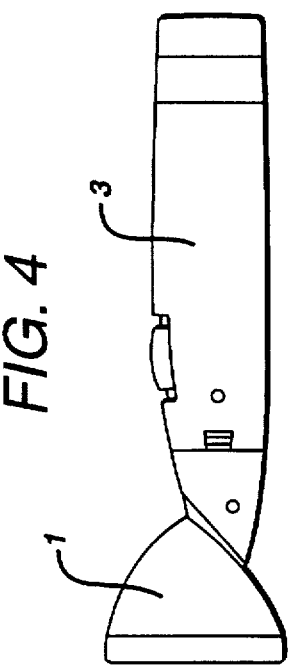

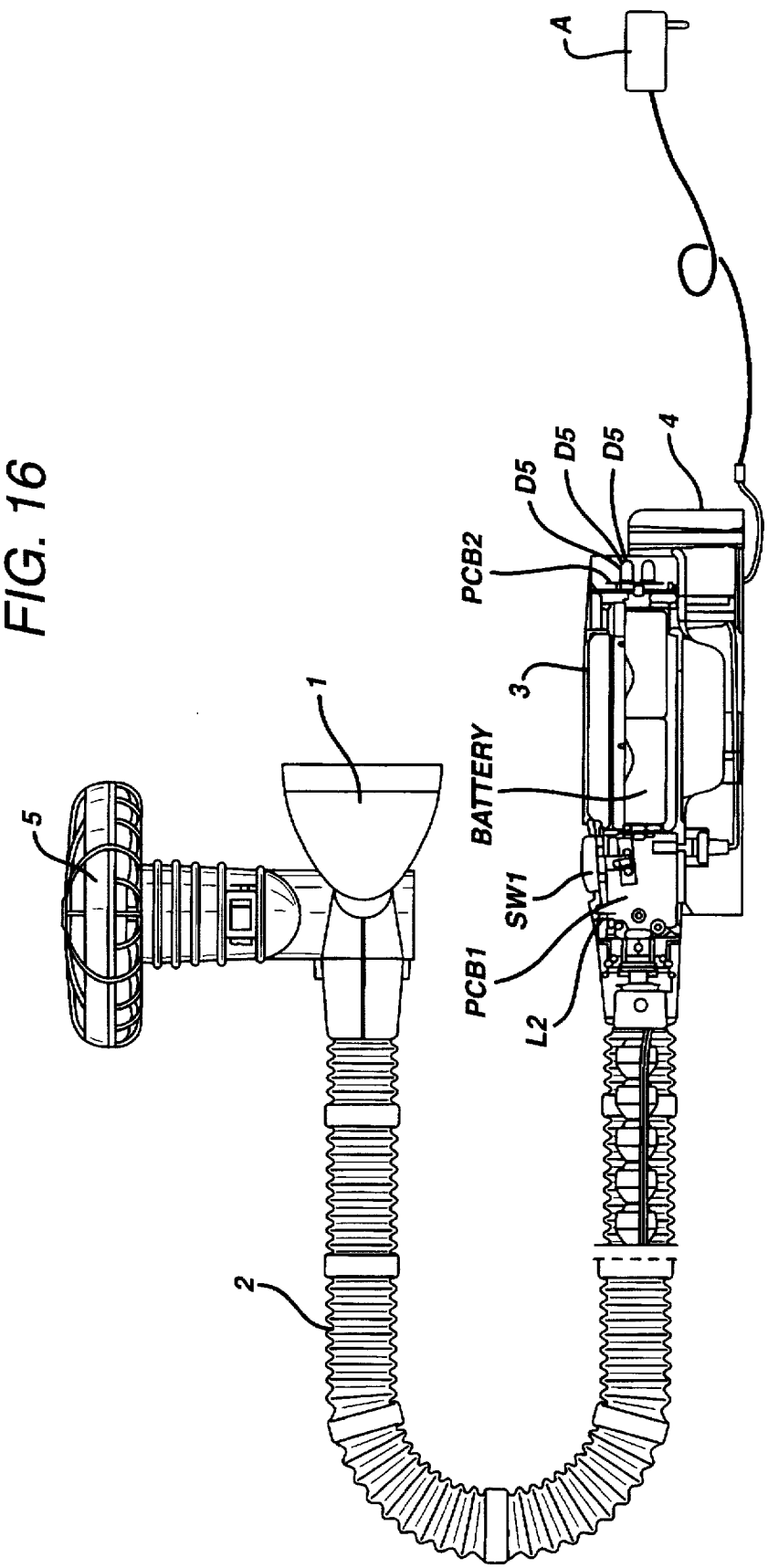

ELECTRONIC CONTROL BATTERY-OPERATED DEVICE OF LAMP WITH FAN

BACKGROUND OF INVENTION

1. Field of Invention

The present invention relates to a device of lamp with fan, particularly, an electronic control multi-function battery-operated device of lamp with fan mainly for camping purposes, which device can be used either as an electric torch, a table or wall lamp for lighting during camping, a bicycle head lamp or a tail light, or even as an SOS signal lamp, a engineering warning light, or a police signal light; or as an electric fan; or, with both lamp and fan fitted, as a light with a blower during a barbecue.

2. Description of Related Art

People in a big city seldom use a battery-operated light (a torch), or fan, except policemen, metermen who read an electric, gas, or water meter, or building guardians. Generally, such a device is used only during power failure, or at night during camping, and the battery of said device can be recharged direct from car cells.

It will be useful to cite some examples as the prior art.

U.S. Pat. No. 5,521,803 disclosed a flashlight with a flexible core, similar to the flexible arm set of the present invention. However, the device according to that patent is only for lighting operated by batteries or a d.c. 12-volt source, having not an interchangeable fan head to work separately or simultaneously when a lamp is lit on, let alone the multiple of advantages of the present invention, as will be described below.

The Rechargeable Products Ltd. of Macao has manufactured a product, the commodity name being CARENA, comprising a head lamp 1 (refer to FIG. 1), a flexible arm set 2, and a handle 3. Said head lamp 1 can be rotated by about 45 degrees and said arm set 2 can be bent into various shapes when the device is used as a table lamp. Said handle 3 houses betteries or rechargeable batteries. If said arm set 2 is removed and said head lamp 1 is directly connected to said handle 3, the device can be used as a torch (see FIG. 2). With that product, the lamp switch is a common on-off one capable of only turning on or off the lamp; moreover, the rechargeable batteries can work for only three hours during camping, and must be taken out to be recharged.

In a word, similar products in the prior art are not at all convenient to use.

OBJECT OF THE INVENTION

Object of the Invention

The object of the present invention is to provide a device of lamp with fan, particularly one much more suitable for camping purposes. Such an object can be attained by incorporating into the said handle 3 a multi-function electronic control circuit board, as well as a multi-position selector switch for controlling LED's; and also by adding a base and a fan head.

Advantages of the Invention

The device according to the present invention has the advantages in that said head lamp is designed to be rotatable by 90 degrees, said base enables the device to be used more conveniently as a table lamp or as a wall lamp, said LED's incorporated in said handle can be used as tail lights for a bicycle, and said multi-function electronic control circuit and multi-position selector switch enable the head lamp and the tail light to be used simultaneously or separately, or the head lamp to flash on and off as an indicator or a signal light, or for lighting under covered circumstances. Bulbs of different colors can be used for different purposes with said head lamp flashing on and off: As an SOS signal with a white or red bulb, as an engineering warning light with a yellow bulb, or a blue bulb fitted on a police or ambulance car, or on a fire car with a red bulb (flashing). Moreover, instead of bulbs of different colors, bulb filters of different colors can also be used.

With the device according to the present invention, the head lamp when flashing on and off can last four times as much as when used for continuous lighting, enough to last through the night just fit for use in military training.

Moreover, when said head lamp is replaced by said fan head, the device can be used as an electric fan where air-condition is lacking or not suited. For instance, in a car said device is useful when the driver wants to sleep for a while, instead of using the air-condition which may cause danger due to damage of the air-conditioner, or due to CO release.

During barbicue, said device can also be used as a blower to avoid giving away one's position due to rising smoke.

Lastly, the device of the present invention has the advantage that the batteries need not be taken out for recharging, thus avoiding any trouble due to wrong replacement. In addition, the present device uses an improved charger and rechargeable batteries, for which patent applications have been filed in both China and USA (CN 96 1 00837.7, and U.S. Ser. No. 08/587,919, filed on Jan. 17th, 1996), thus avoiding a possible explosion when unrechargeable batteries are wrongly replaced.

BRIEF DESCRIPTION OF THE DRAWINGS

The above advantages, as well as others, of the present invention will be clearly seen according to the description below, with reference to the attached drawings, wherein:

FIG. 3 illustrates a first embodiment of the present invention, showing the present device used as a table lamp;

FIG. 4 is a second embodiment of the present invention, wherein the device is used as an electric torch;

FIG. 5A is another embodiment of the device of the invention.

DESCRIPTION OF THE INVENTION

Figure 11:
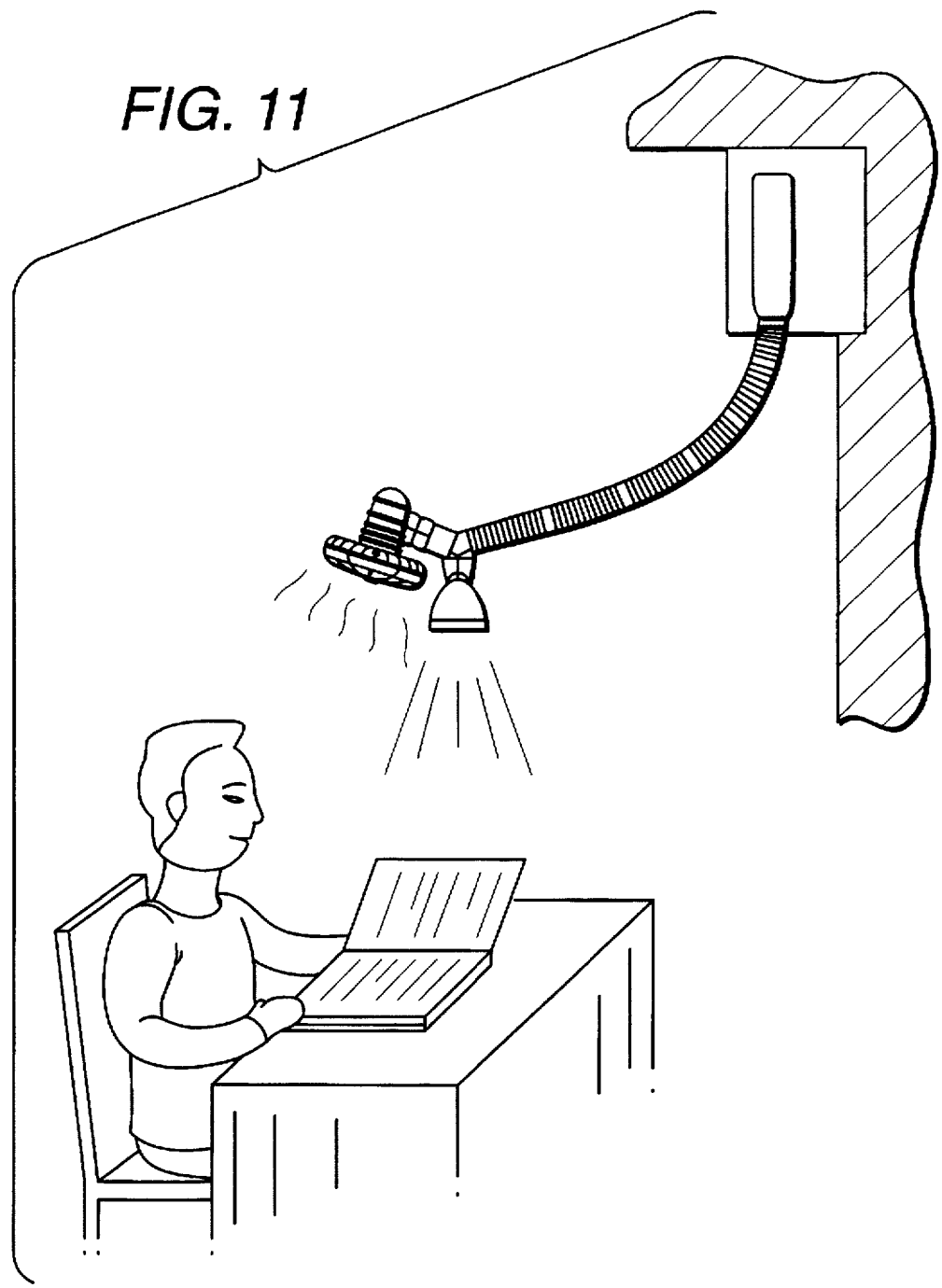
FIG. 11 is an illustration showing simultaneous use of said fan and said lamp, with said flexible arm set attached, according to Embodiment 4 of the present invention.
Figure 12:
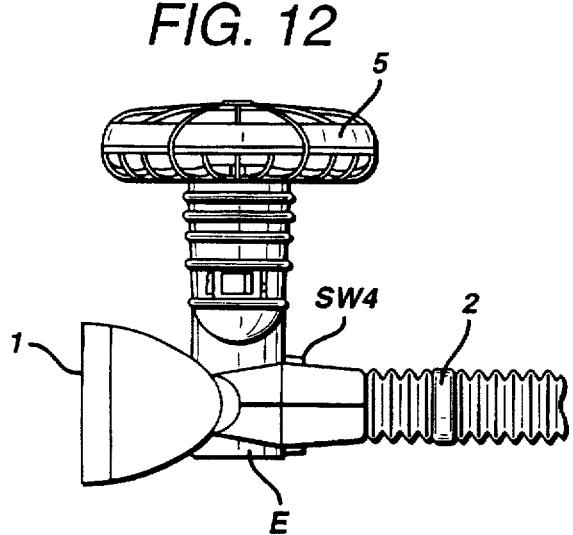
FIG. 12 is an illustration of Embodiment 4, showing how said fan and said lamp are fitted for simultaneous use.

The device of lamp with fan according to the present invention comprises, when connected to be a lamp (table or wall lamp), a head lamp 1, a flexible arm set 2, a handle 3, a base 4, and an adapter A for charging rechargeable batteries, charging being indicated by a charging indicator L2 (see FIG. 3); or, when connected as an electric torch, a head lamp 1, and a handle 3 (see FIG. 4); or, when connected as a fan (table or wall fan), a head fan 5, a flexible arm set 2, a handle 3, a base 4, and a charging adapter A (see FIG. 5); or, when both lamp and fan are in use, a head lamp 1, a head fan 5, a flexible arm set 2, a handle 3, a base 4, a charging adapter A, and a three-way connector 6 (see FIGS. 11 and 12).

Referring to FIG. 3, the first embodiment of the present invention comprises a head lamp 1, a flexible arm set 2, a handle 3, and a base 4, which are all of plug-in connection. As shown in FIG. 3, said head lamp can be freely rotated, forming a biggest angle of 90 degrees between its axis and that of the connecting arm set (see position of head lamp shown by dotted line). The flexible arm set 2, while used as a supporter for said head lamp 1, can be bent as you like, so as to fix said head lamp 1 at a certain height. Said arm set 2 can also be fixed with clamps (not shown) to the human body, at the waist or near the neck, the arm set being used also as an extender to keep the head lamp away from the human body. Said handle 3 contains two 1.5-volt betteries, or preferably two 1.2-volt rechargeable batteries, which can be charged, without being taken out, by means of a multi-function electronic control circuit board PBC 1. Besides, there are contained in said handle 3 also a five-position selector switch SW1 and LED's D5, D6, D7, which, when lit on through a transparent tail cover at the rear part of said handle, can be used as a tail light.

Figure 6:
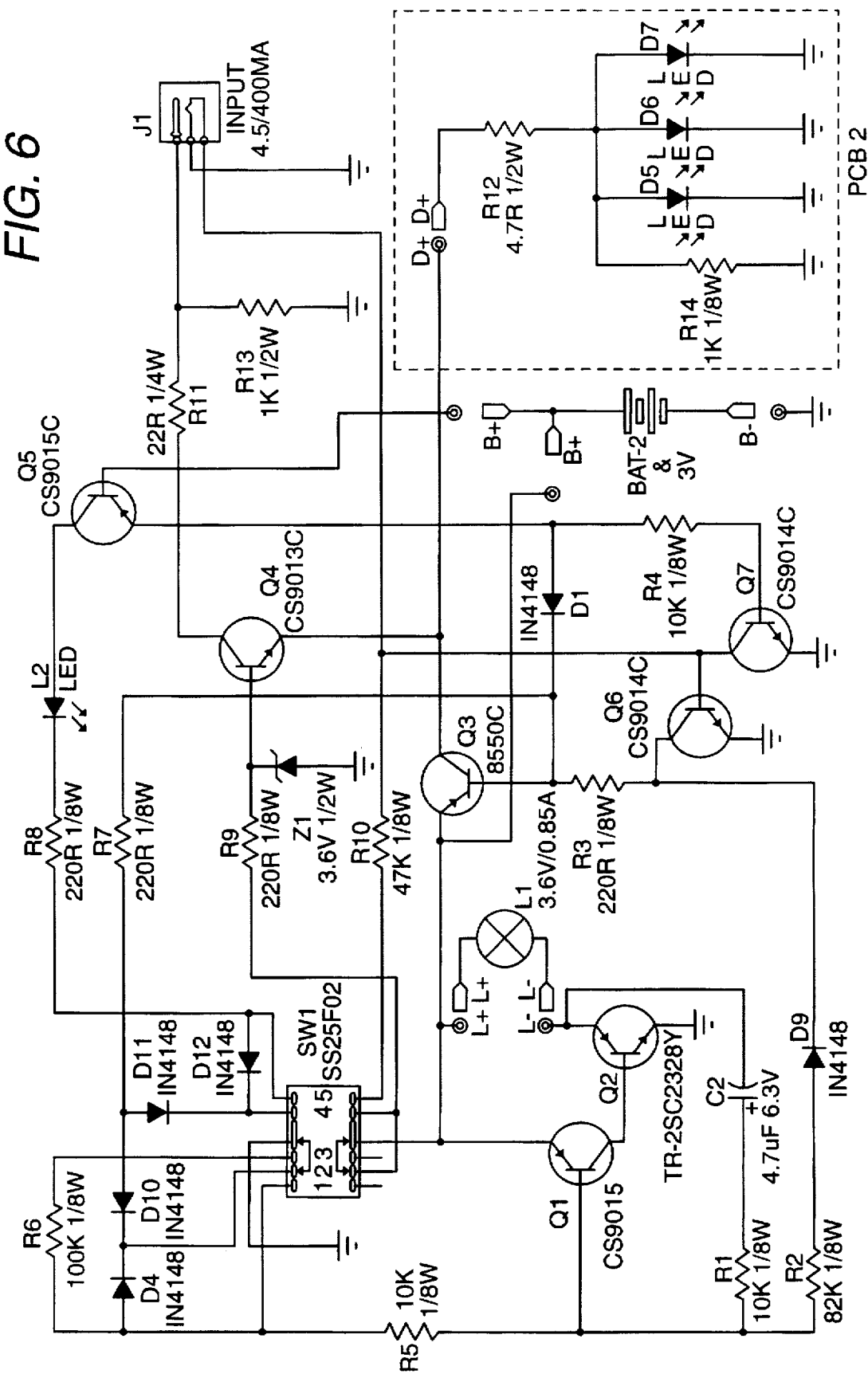
FIG. 6 is the electronic circuitry of the multi-function electronic control circuit board, PCB 1, of the present invention.
Figure 7:
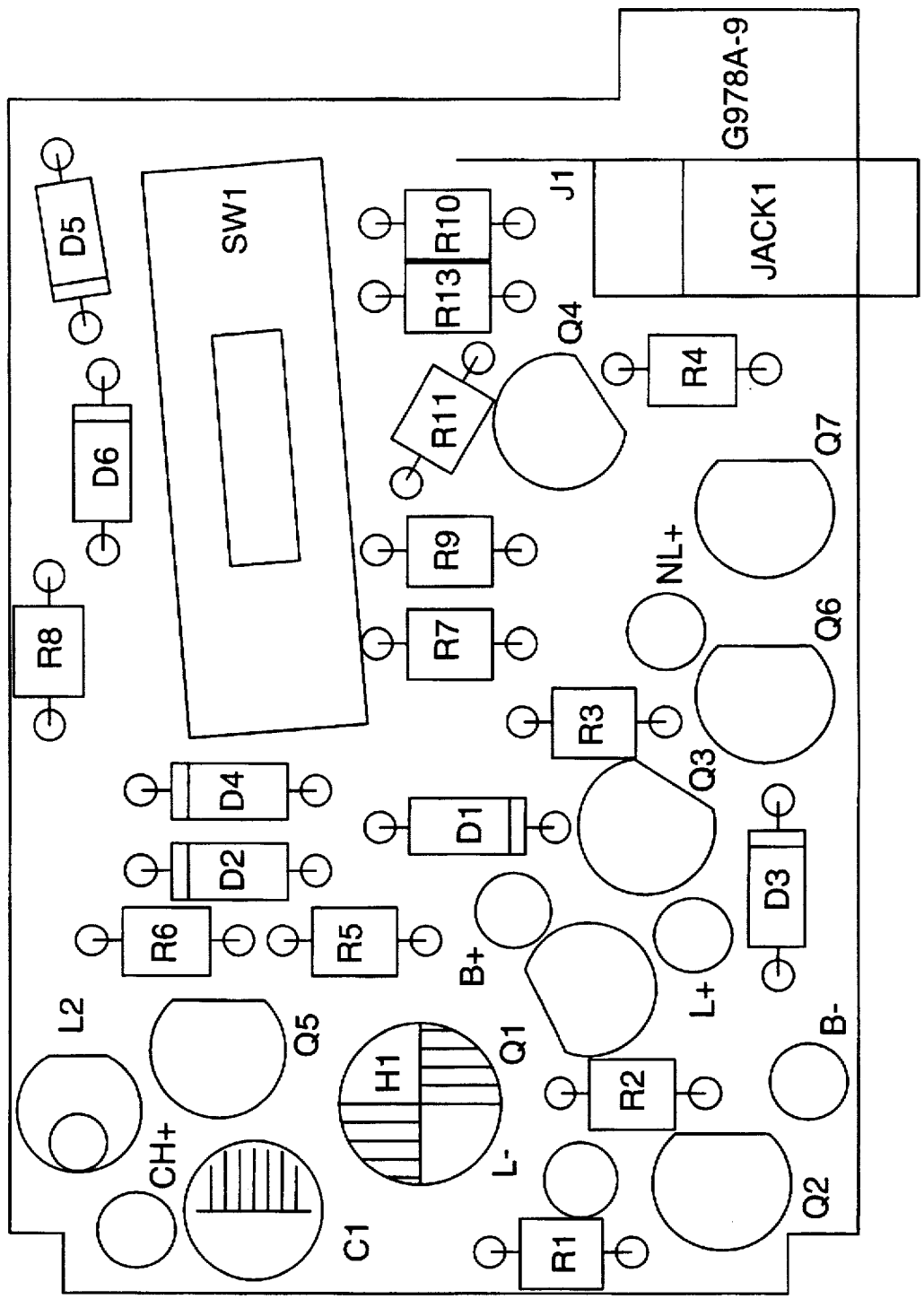
FIG. 7 is a top view showing arrangement of the various parts on said PCB 1 in FIG. 6.
Figure 8:
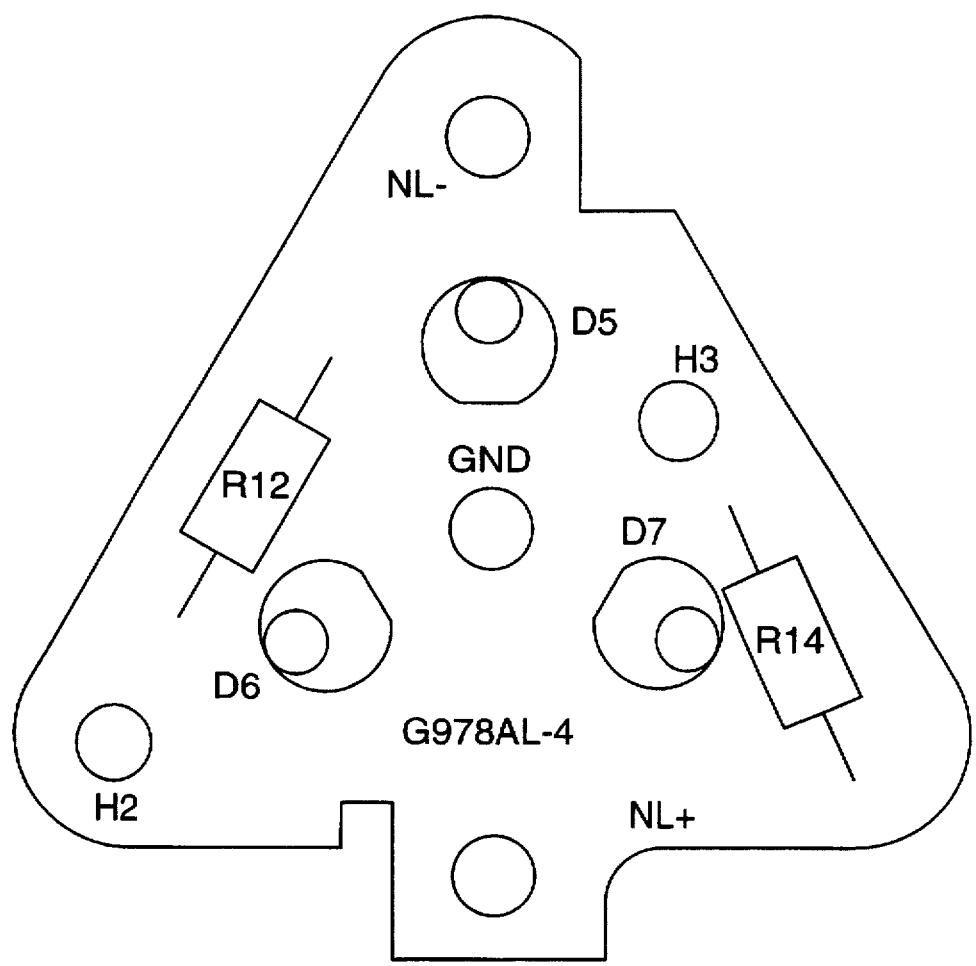
FIG. 8 is a top view showing arrangement of parts on another circuit board PCB 2 on said board PCB 1 in FIG. 6.

The circuitry of said multi-function electronic control circuit PCB 1 is shown in FIG. 6, in which said switch SW1 is seen to have five positions. Said head lamp and tail light are operated by said switch SW1. The normal position of SW 1 is (1), at which only the head lamp is lit up; at position (2), both the head lamp and the tail lights D5, D6, D7 are lit on; when SW1 is turned to position (3), the head lamp is made to flash at a frequency of about once per second, said frequency being determined by the values of a resistor R1 and a capacitor C2 (changing their values can change the frequency of flash); while in position (4), only the tail light is lit on; and at position (5), both the head lamp and the tail light are turned off. D5, D6, D7, R12 and R14, as shown within the dotted line box in FIG. 6 are fitted on another circuit board PCB 2 (FIG. 8). With the exception of the bulb L1 which is fitted inside said head lamp 1, all the rest of parts are fitted on said PCB 1.

When charging the batteries, an adapter A is used, inserted into a jack J1 (see FIG. 3). The adapter A is suited for the mains of 100 or 230 volts, while its d.c. output is 4.5 volts. Alternatively, a d.c. to d.c. adapter could also be used for charging direct from the car cells.

It should be noted here that when charging, said Switch SW1 should preferably not be put at positions (1), (2), or (3), since at those three positions, said head lamp is turned on, thus resulting in a simultaneous charging and discharging. As the discharging current is sometimes several times as much as the charging current, charging could not be completed as usual, or would even become impossible. That is why SW1 should be turned to (4) or (5) during charging, whereby a charging indicator L2 (refer to FIG. 3) is on showing charging in progress. If SW1 is placed at position (5), in case of a power failure, the tail light will light up and the head lamp will flash, while the charging indicator L2 is turned off, showing charging discontinued. Under such circumstances, the flashing head lamp could still function for emergency use.

FIG. 4 shows a second embodiment of the present invention. When the flexible arm set 2 and base 4 are removed, and the head lamp 1 is directly connected to the handle 3, the device according to the present invention can be used as an electric torch.

Figure 1:
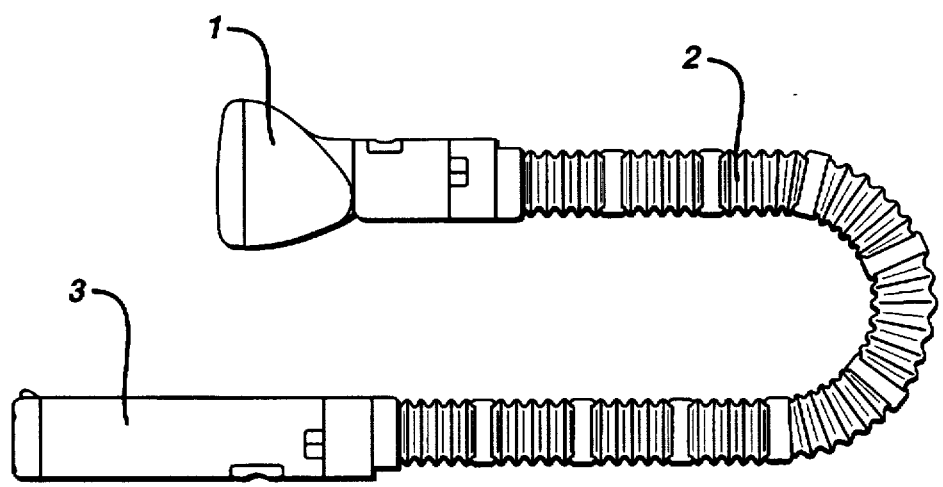
FIG. 1 shows a prior art product used as a table lamp.
Figure 2:
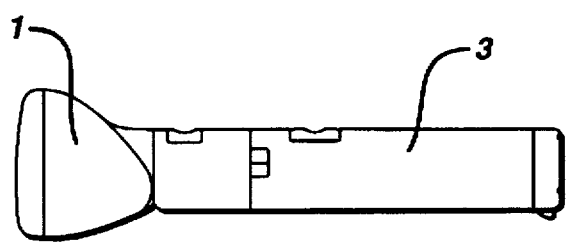
FIG. 2 shows a prior art product used as an electric torch.
Figure 5:
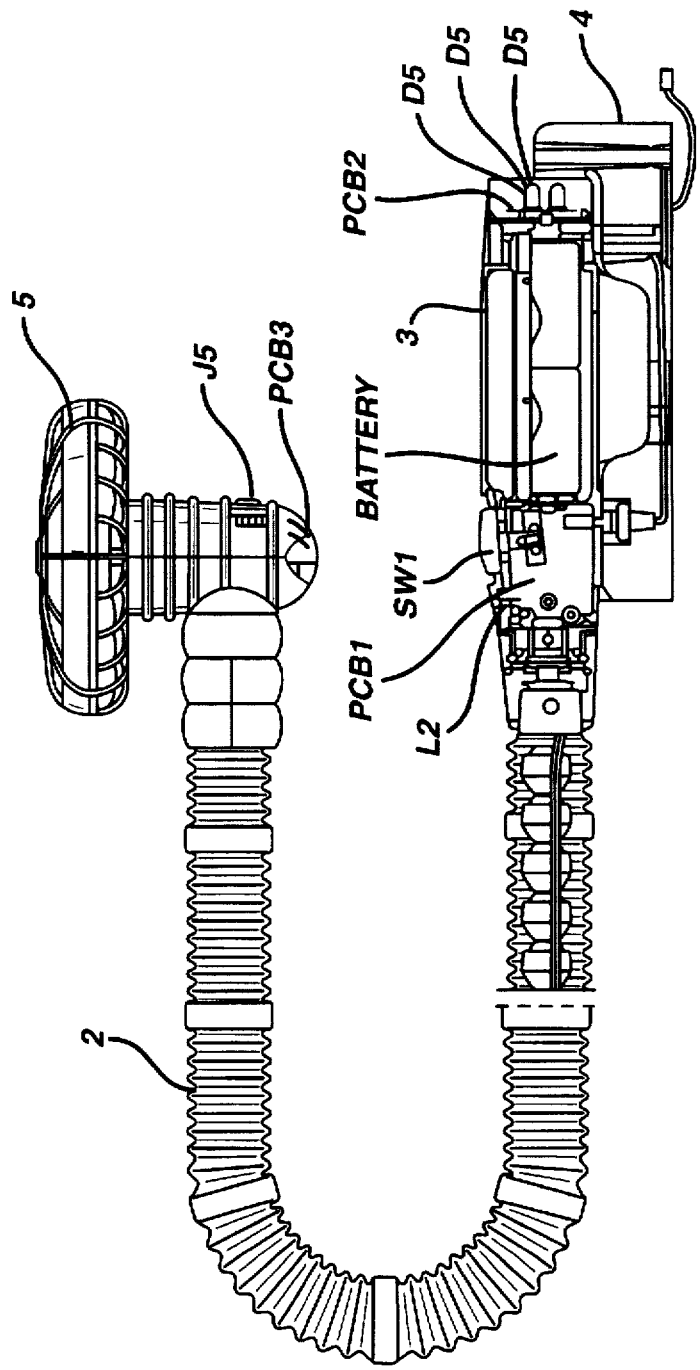
FIG. 5 is a third embodiment showing the present device used as a table fan.

FIG. 5 shows a third embodiment of the present invention. With the head lamp 1 replaced by a fan head 5, the device according to the present invention can be used as a table fan. Said fan head 5 contains a two-position speed-change switch J5 and a voltage multiplier board PCB 3, for change of the fan's rotation speed. When J5 is at the low position, said voltage multiplier does not function, and the fan could work for a considerably long time.

Figure 9:
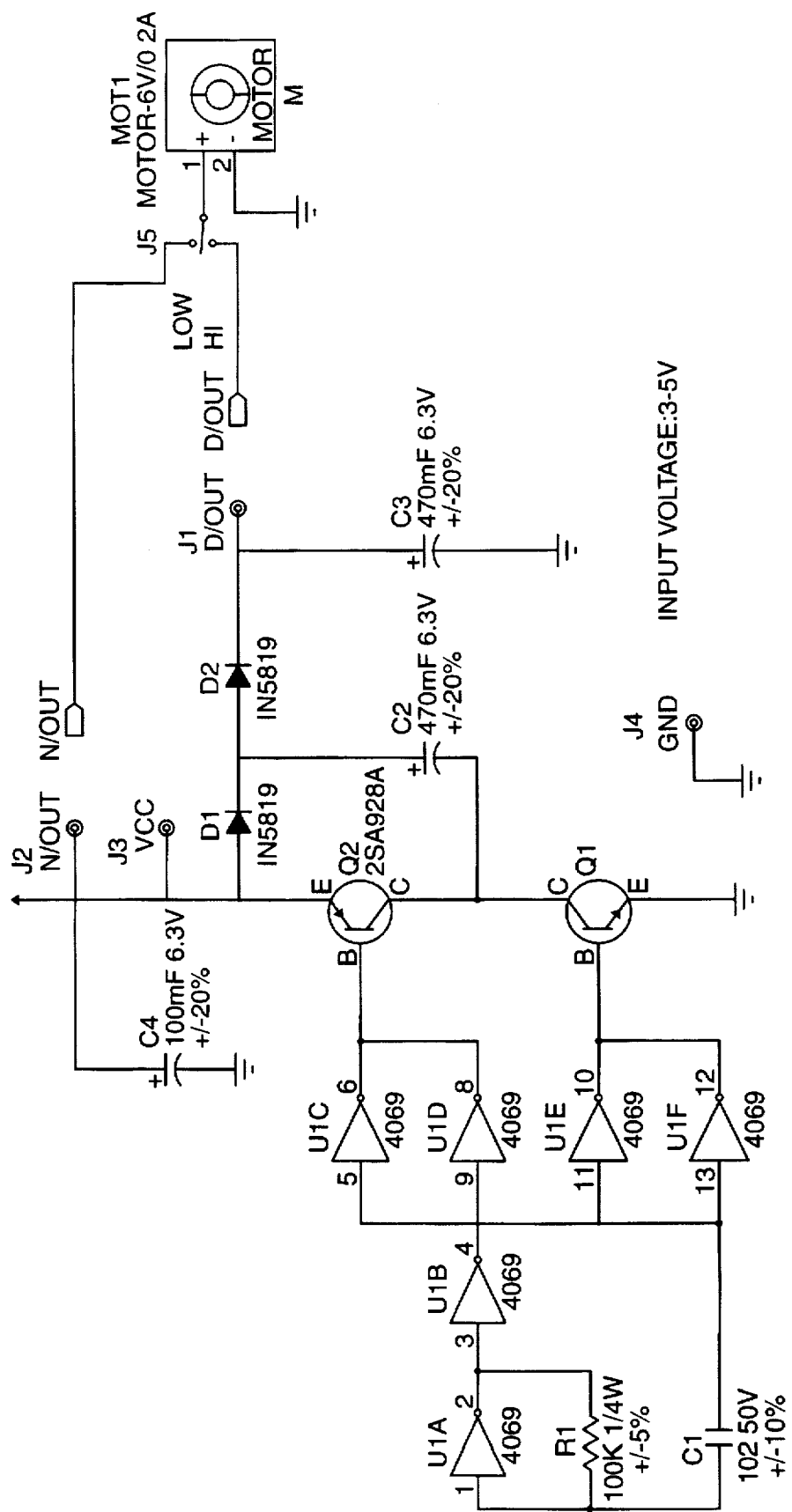
FIG. 9 is the circuitry for voltage multiplication for the fan head of the present invention.
Figure 10:
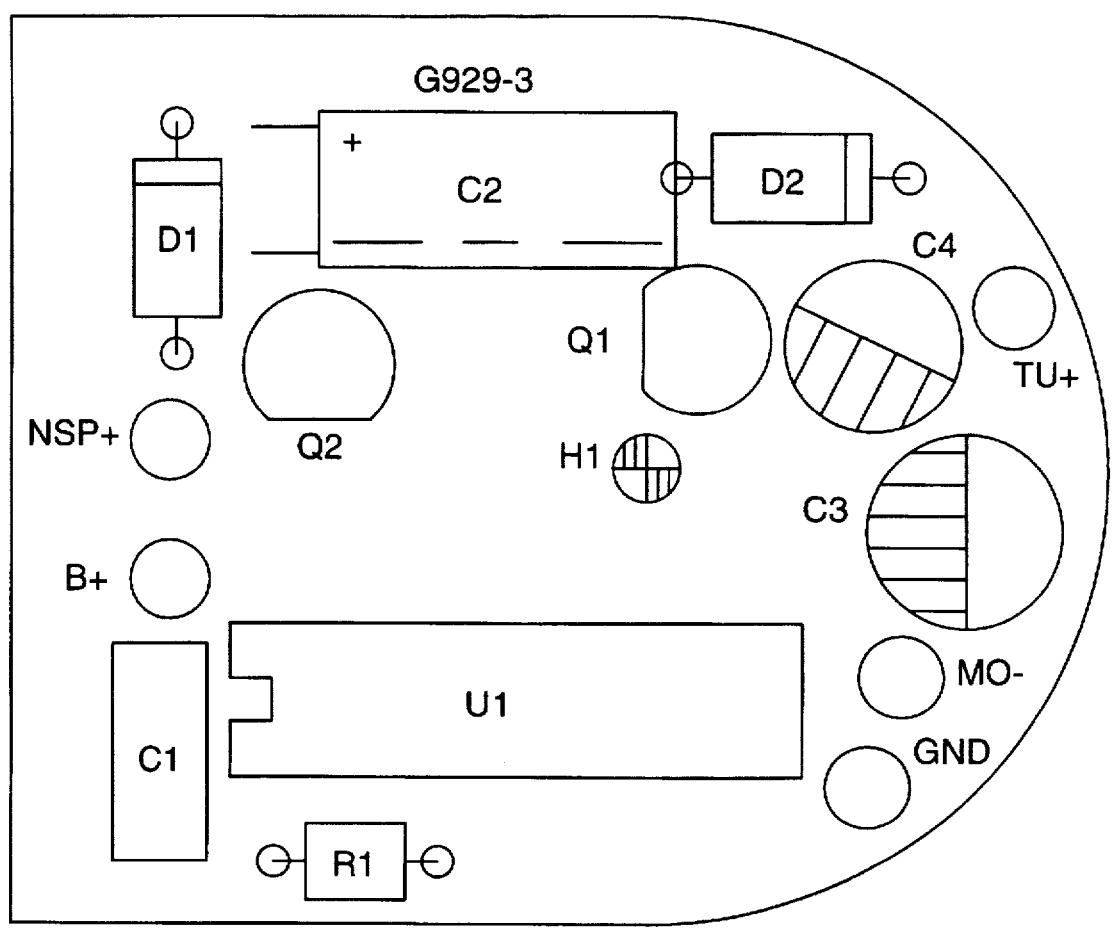
FIG. 10 is a top view showing parts arranged on a third board PCB 3 in said voltage multiplication circuitry, shown in FIG. 9.

FIG. 9 is the electronic circuitry of the fan head's voltage multiplier. As seen in the Figure, J5 is a two-position speed-change switch. When J5 is set to the LOW position, the fan motor M rotates at a low speed resulting in a considerably long fan-working time. If set to the HI position, said voltage multiplier functions and the fan motor M starts turning at a high speed, with a best working efficiency. The voltage multiplier consists of an oscilating circuit formed by the NAND gates U1A, U1B, R1 and C1, NAND gates U1C, U1D, U1E, U1F, and an amplifier circuit formed by Q1 and Q2, plus a multiplier circuit formed by D1, C2, D2, C3. All the NAND gates are incorporated inside an IC 4069 (marked as U1 in FIG. 10, which shows a third board PCB 3 on which the afore-said parts are mounted).

When used as a fan, the switch SW1 on the handle 3 should be set to position (1) for the fan to work. If a simultaneous lighting of the tail lights is needed, then set SW1 to position (2). When set to position (5), the fan stops working. If set to position (3), the fan will be working on and off, as if producing blasts of natural wind. Inasmuch, there are four selections for the fan speed, considering both fast and slow rotation and on and off working.

If charging is to be performed simultaneously when the fan is in use, then the adapter A should be increased in its output power to, for instance, 4.5 v./800 mA from the original 4.5 jv./400 mA in FIG. 6. Then set SW1 to (1). With the fan rotating at low speed, you still have a charging current of about 80 mA. Even if the fan is working at a high speed, charging is still possible at 20 mA. With SW1 set to (4) or (5), and an adapter of larger output power fitted, a charging current of 150 mA could be reached, which would certainly greatly reduce the charging time.

FIGS. 11 and 12 show a fourth embodiment of the present invention. In that embodiment, both the head lamp 1 and the fan head 5 are simultaneously connected by means of a three-way connector E to said arm set 2, and the handle and base are fixed onto the wall. Said three-way connector E is also of the plug-in type. As for SW1, same as before, it should usually be set to position (1). When SW1 is set to (2), the red tail lights will light up; if set to (5), power would be cut off. Said fan's speed can be changed by means of the speed-change switch on said fan head. Besides, said three-way connector is provided with a four-position switch SW4, corresponding to a) head lamp lit on but fan stops; b) fan works but head lamp is off; c) both head lamp and fan work; and d) power is supplied on and off.

Figure 13:
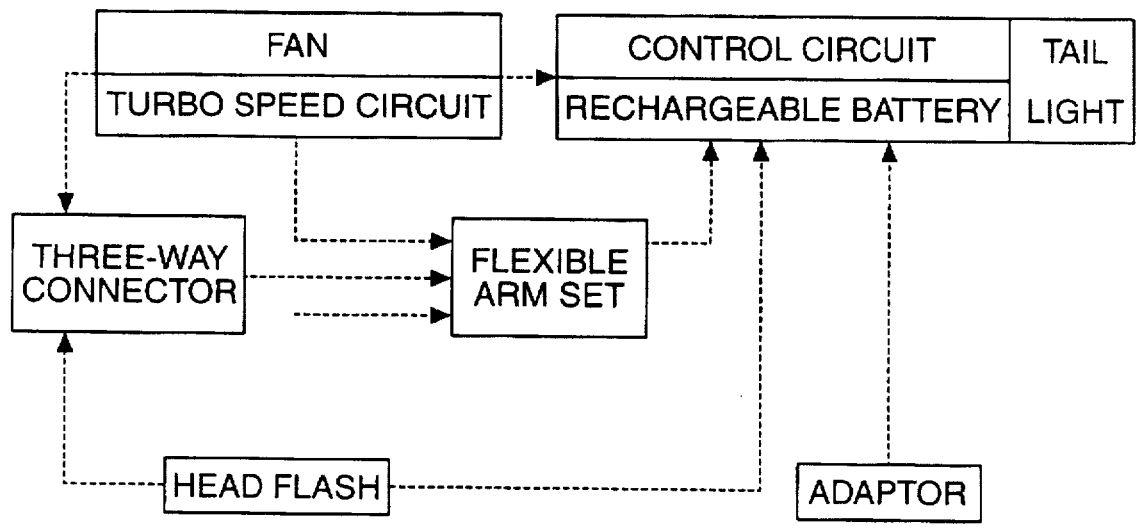
FIG. 13 is a block diagram showing connection of said lamp and fan.

FIG. 13 is a concise block diagram showing arrangements other than stated in Embodimants 1 through 4. For instance, the fan head 5 can be directly connected to the handle 3, to make a hand-carry fan; or else, both the head lamp and fan can be connected, through said three-way connector, directly to said handle, to make a hand-carry fan with lamp. Multipurpose arrangements also add to the advantages of the present invention.

Figure 14:
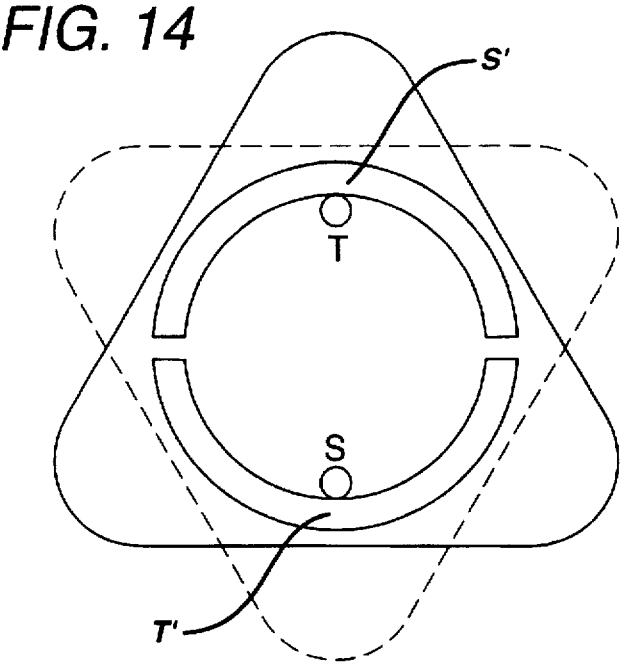
FIG. 14 is an improved structure showing how the tail of said handle according to the present invention can be made to emit light of different colors.

FIG. 14 is an illustration showing how the tail lights change colors. The circuit board PCB 2 is located inside a tail cover of the handle, and can rotate together with the said tail cover (see dotted line in the Figure). Said board PCB 2 is provided with two contacts S and T, and inside the handle there is provided a pair of semi-circles S' and T' in contact with said contacts S and T. When the tail cover is rotated by 180 degrees with respect to the handle, said contacts S and T get into touch with T' and S', resp., instead of S' and T'. Thus, instead of LED's D5, D6, and D7, D5', D6' and D7' light on (see FIG. 15) in green color as against red color when D5, D6, D7 light up.

Figure 15:
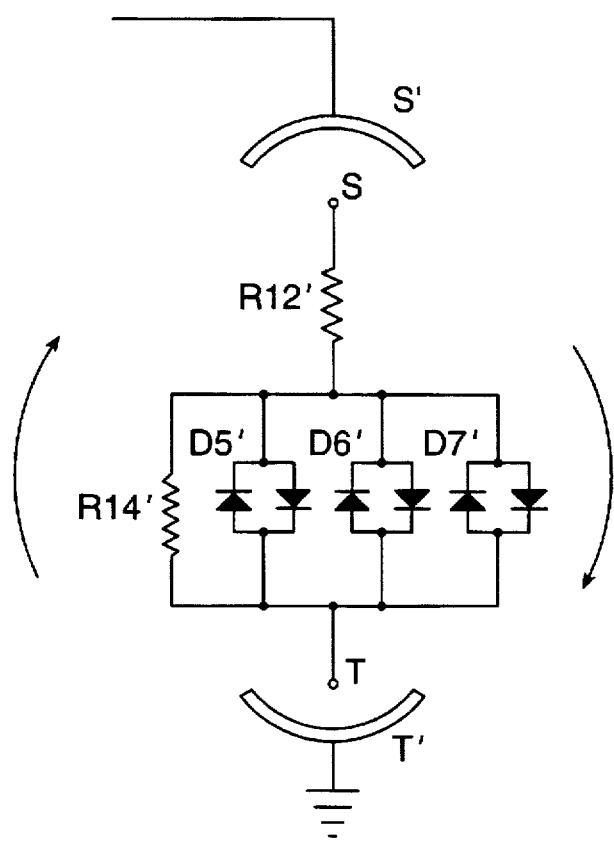
FIG. 15 shows an improved circuitry of PCB 2 enabling the tail of said handle according to the present invention to emit different-color light.

FIG. 15 is an illustration showing how the tail lights can change in colors.

It should be noted here that the handle for Embodiments 1 through 4 is all triangular in section, same as said board PCB 2 (refer to FIG. 8). Therefore, as shown in FIG. 14, when the tail cover containing said PCB 2 is rotated by 180 degrees with respect of the handle, said tail cover and said handle no longer coincide. That, however, in no sense affects any of the functions of the device. As a matter of fact, said handle and said tail cover can also be changed to other sectional shapes, such as circular, square, hexagonal, or octahedral.

Above was a detailed description of the present invention. It should be noted, however, that the present invention is also to cover any modified or amended embodiments carried out by any ordinary skilled person in the art within the scope covered by the claims of the present invention.

Below is a table listing the specification/value of the parts in FIG. 6

| Description | Spec./value | Description | Spec./value |
| --- | --- | --- | --- |
| Q1 | CS9015 | R1 | 10K |
| Q2 | TR-2SC2328Y | R2 | 82K |
| Q3 | 8550C | R3 | 220W |
| Q4 | CS9013C | R4 | 10K |
| Q5 | CS9015C | R6 | 100K |
| Q6 | CS9014C | R7 | 220W |
| Q7 | C59014C | R8 | 220W |
| D1 | IN4148 | R9 | 220W |
| D4 | IN4148 | R10 | 47K |
| D9 | IN4148 | R11 | 22W |
| D10 | IN4148 | R12 | 4.7W |
| D11 | IN4148 | R13 | 1K |
| D12 | IN4148 | R14 | 1K |
| Z1 | 3.6V; ½ W | C2 | 4.7 μF |
| D5 | LED | L1 | 3.6V/0.85A (bulb) |
| D6 | LED | L2 | LED |
| D7 | LED | | |

For the specification/value of the parts in FIG. 9, see the table below.

| Description | Spec./value | Description | Spec./value |
| --- | --- | --- | --- |
| C1 | .001 μF | R1 | 100K |
| C2 | 470 MF | M | Motor 6V/0.2A |
| C3 | 470 MF | D1 | IN5189 |
| C4 | 100 MF | D2 | IN5189 |
| Q1 | 2SC2328A | U1 | 4069 |
| Q2 | 2SA928A | | |

What is claimed is:

1. An electronically controlled lamp device comprising:
a charging adapter connected to a base, said base having a handle docking port;
a handle docked in said handle docking port, said handle having a rechargeable battery rechargeable from said charging adapter, an electronic control circuit regulating operation of said electronically controlled lamp device, and a user input associated with the control circuit, said handle further comprising a first multi-function docking port;
a flexible arm having first and second ends, the first end docked in the first multi-function docking port, the second end being electrically connected with the first end and supporting a second multi-function docking port thereon;
a lamp head docked in the second multi-function docking port;
wherein said handle may be removed from the handle docking port for portable operation of the device, and said lamp head also able to dock in the first multi-function docking port when said flexible arm is not used.

2. A lamp device as claimed in claim 1, wherein said user input is a multi-position selector switch.

3. A lamp device as claimed in claim 1, wherein said handle further comprises three light emitting diodes on the circuit board.

4. An electronically controlled fan device comprising:
a charging adapter connected to a base, said base having a handle docking port;
a handle docked in said handle docking port, said handle having a rechargeable battery rechargeable from said charging adapter, an electronic control circuit regulating operation of said electronically controlled lamp device, and a user input associated with the control circuit, said handle further comprising a first multi-function docking port;
a flexible arm having first and second ends, the first end docked in the first multi-function docking port, the second end being electrically connected with the first end and supporting a second multi-function docking port thereon;
a fan head having a multi-position speed-changing switch and a voltage multiplier board, said fan head docked in the second multi-function docking port;
wherein said handle may be removed from the handle docking port for portable operation of the device, and said fan head also able to dock in the first multi-function docking port when said flexible arm is not used.

5. A fan device as claimed in claim 4, wherein said user input is a multi-position switch.

6. An electronically controlled combination lamp and fan device, said device comprising:

a charging adapter connected to a base, said base having a handle docking port;

a handle docked in said handle docking port, said handle having a rechargeable battery rechargeable from said charging adapter, an electronic control circuit regulating operation of said electronically controlled lamp device, and a user input associated with the control circuit, said handle further comprising a first multi-function docking port;

a flexible arm having first and second ends, the first end docked in the first multi-function docking port, the second end being electrically connected with the first end and supporting a second multi-function docking port thereon;

a three way connector having three branches and a multi-position switch, the first branch docked in the second multi-function docking port, the second branch being electrically connected through the multi-position switch to the first branch and supporting a third multi-function docking port, and the third branch being electrically connected through the multi-position switch to the first branch and supporting a fourth multi-function docking port;

a lamp head docked in either the third or fourth multi-function docking ports;

a fan head having a multi-position speed-changing switch and a voltage multiplier board, said fan head docked in either the third or fourth multi-function docking ports;

wherein said handle may be removed from the handle docking port for portable operation of the device, and the first branch of said three way connector may be docked in the first multi-function docking port when said flexible arm is not used.

7. A device as claimed in claim 6, wherein said user input is a multi-position selector switch.

8. A device as claimed in claim 6, wherein said handle further comprises three light emitting diodes on the circuit board.

9. A device as claimed in claim 6, wherein said multi-position speed-change switch is a two-position switch.

10. A device as claimed in claim 6, wherein said multi-position switch in said three-way connector is a four-position switch.

11. An electronically controlled lamp device comprising:

a charging adapter connected to a base, said base having a handle docking port:

a handle docked in said handle docking port, said handle having a rechargeable battery rechargeable from said charging adapter, an electronic control circuit regulating operation of said electronically controlled lamp device, and a user input associated with the control circuit, said handle further comprising a first multi-function docking port, a flexible arm having first and second ends, the first end docked in the first multi-function docking port, the second end being electrically connected with the first end and supporting a second multi-function docking port thereon;

a lamp head docked in the second multi-function docking port;

said lamp head also able to dock in the first multi-function docking port when said flexible arm is not used;

wherein said handle comprises a tail cover which further contains a circuit board supporting light emitting diodes and related resistors, said tail cover being provided with two contacts which are in touch with two corresponding semi-circles provided in said handle, said tail cover being rotatable with respect to said handle by 180 degrees.

12. A device as claimed in claim 11, wherein there are provided on said tail cover circuit board a number of pairs of light emitting diodes, each pair being connected in opposite directions.

13. A device as claimed in claim 12, wherein said number of pairs of light emitting diodes is three.

14. An electronically controlled fan device comprising:

a charging adapter connected to a base, said base having a handle docking port, a handle docked in said handle docking port said handle having a rechargeable battery rechargeable from said charging adapter, an electronic control circuit regulating operation of said electronically controlled lamp device and a user input associated with the control circuit, said handle further comprising a first multi-function docking port, a flexible arm having first and second ends, the first end docked in the first multi-function docking port, the second end being electrically connected with the first end and supporting a second multi-function docking port thereon;

a fan head having a multi-position speed-changing switch and a voltage multiplier board, said fan head docked in the second multi-function docking port;

said fan head also able to dock in the first multi-function docking port when said flexible arm is not used;

wherein said handle comprises a tail cover which further contains a circuit board carrying light emitting diodes and related resistors, said tail cover being provided with two contacts which are in touch with two corresponding semi-circles provided in said handle, said tail cover being rotatable with respect to said handle by 180 degrees.

15. A device as claimed in claim 14, wherein there are provided on said tail cover circuit board a number of pairs of light emitting diodes, each pair being connected in opposite directions.

16. A device as claimed in claim 15, wherein said number of pairs of light emitting diodes is three.

* * * * *

UNITED STATES PATENT AND TRADEMARK OFFICE
CERTIFICATE OF CORRECTION

PATENT NO. : 5,791,763
DATED : Aug. 11, 1998
INVENTOR(S) : Chan Kam-Hoi

It is certified that error appears in the above-indentified patent and that said Letters Patent is hereby corrected as shown below:

In column 4, line 49, change "4.5jv./400mA" to -- 4.5 v./400mA --.

In column 5, Table in figure 6, 2nd column, 8th row, change "C59014C" to -- CS9014C --.

Signed and Sealed this

Twenty-seventh Day of March, 2001

Attest:

NICHOLAS P. GODICI

Attesting Officer

Acting Director of the United States Patent and Trademark Office